United States Patent [19]

Steinberger

[11] Patent Number: 4,603,395
[45] Date of Patent: Jul. 29, 1986

[54] METHOD OF DETERMINING CLAMPING FORCE

[75] Inventor: Josef Steinberger, Düsseldorf, Fed. Rep. of Germany

[73] Assignee: Paul Forkardt GmbH & Co. KG, Düsseldorf, Fed. Rep. of Germany

[21] Appl. No.: 424,658

[22] Filed: Sep. 27, 1982

[30] Foreign Application Priority Data

Dec. 15, 1981 [DE] Fed. Rep. of Germany ....... 3149612

[51] Int. Cl.$^4$ .............................................. G06F 15/20
[52] U.S. Cl. ................... 364/506; 73/862.38; 73/862.69
[58] Field of Search ............. 364/506; 73/761, 862.38, 73/862.69

[56] References Cited

U.S. PATENT DOCUMENTS

| | | | |
|---|---|---|---|
| 3,681,982 | 8/1972 | Hiratsuka et al. | 73/862.69 |
| 3,940,992 | 3/1976 | Jost et al. | 73/862.69 |
| 4,110,829 | 8/1978 | Boys | 364/577 |
| 4,232,547 | 11/1980 | Kasper | 73/862.67 |
| 4,333,351 | 6/1982 | Bickford | 73/761 |
| 4,397,196 | 8/1983 | Lemelson | 364/508 |
| 4,400,785 | 8/1983 | Wallace et al. | 73/761 |
| 4,471,444 | 9/1984 | Yee et al. | 364/508 |

Primary Examiner—Errol A. Krass
Assistant Examiner—Heather R. Herndon
Attorney, Agent, or Firm—Martin A. Farber

[57] ABSTRACT

A method for selecting the proper clamping force to be applied by a rotatable chuck against a workpiece of known rigidity comprises the steps of inserting a transducer of known rigidity into a chuck of known rigidity, measuring the clamping force under conditions of a stand-still and rotation to obtain a change in clamping force induced by rotation, and multiplying the change of force by a correction factor involving the foregoing rigidities to obtain a predicted change of clamping force which would be experienced upon insertion of the workpiece in the chuck. The predicted change in clamping force enables an operator to select a sufficient amount of clamping force for safely retaining a workpiece in the chuck during rotation.

7 Claims, 5 Drawing Figures

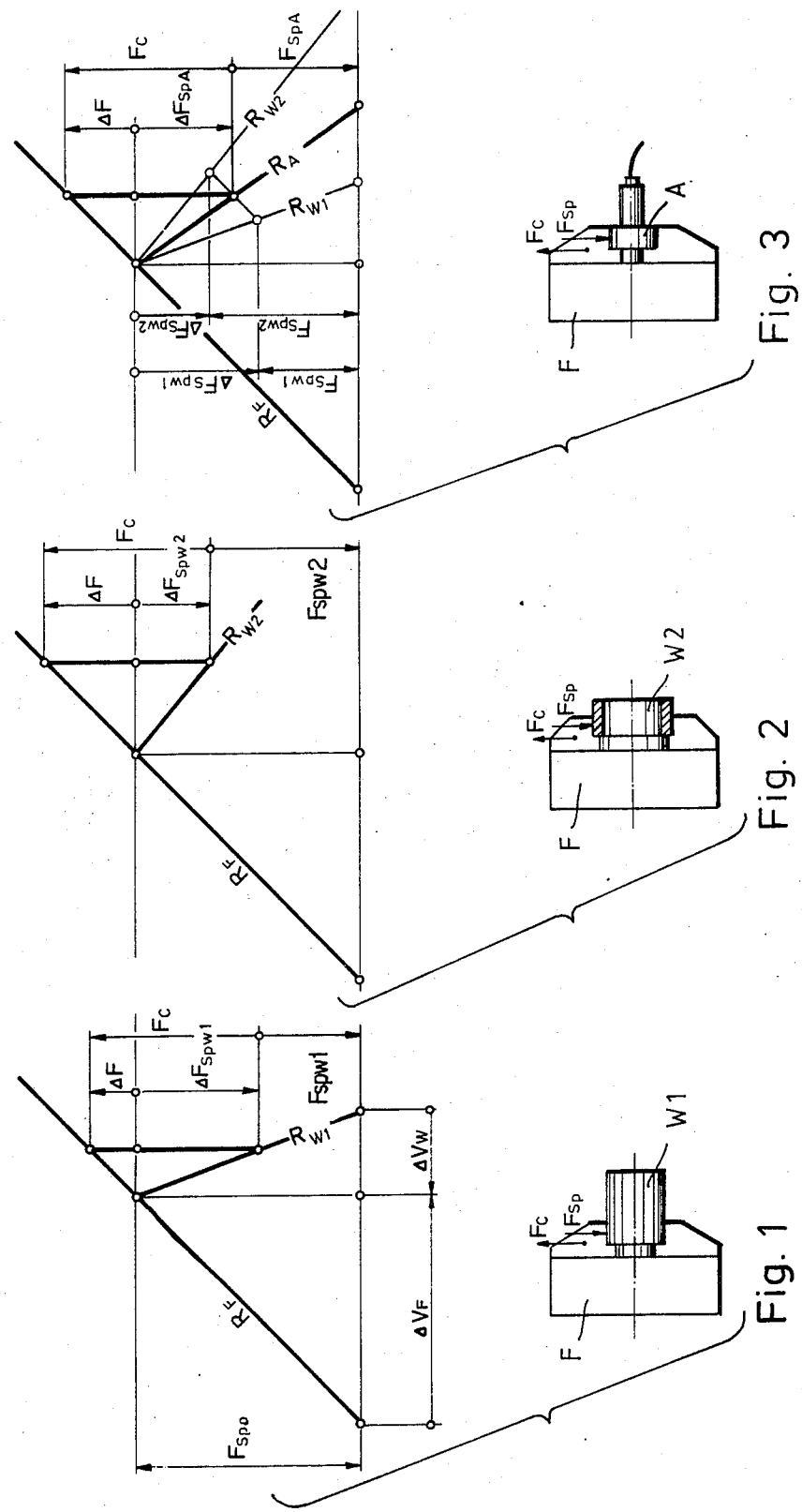

METHOD OF DETERMINING CLAMPING FORCE

BACKGROUND OF THE INVENTION

The present invention relates to a method of determining, by means of a clamping-force transducer which is clamped in position instead of the workpiece, the clamping force present in a given condition of clamping in a rotating clamping device for holding a given workpiece fast, taking into consideration the centrifugal force.

Upon the operation of rotating clamping devices, centrifugal force effects occur which act on the clamping elements, which in their turn act radially from the outside on the workpiece in a direction opposite the direction of the clamping force so as to result in a reduction in the clamping force. The amount of centrifugal force depends on the mass of the radially movable clamping elements and the speed of rotation of the clamping device, centrifugal force increasing as the square of the increase in speed of rotation. This increase of the centrifugal force by a power of two correspondingly reduces the clamping force present at standstill upon an increase in the speed of rotation so that the danger exists that, during a chip removal operation, particularly if it is effected by the use of modern cutting tools of high cutting speed, the required holding force of the rotating device for the clamping of the workpiece will no longer be present and the workpiece will be thrown out of the clamping device.

In order to avoid this danger it is known to measure the clamping force, not only with the clamping device stationary but also with the clamping device in rotation, by means of a clamping-force transducer which is clamped in the clamping device instead of a workpiece. As is well known, such transducer may be coupled via slip rings to electrical measurement circuitry for obtaining electric signals during rotation of the chuck and transducer. In this way it has been attempted to determine, before clamping the workpiece to be machined into position, whether the clamping force applied by the clamping device at the operating speed will be sufficient, under the prevailing operating conditions and despite the centrifugal force, to hold the workpiece safely in the clamping device.

In this connection, the fact is disregarded that the holding force of the clamping device upon operation is dependent not only on the rigidity of the clamping device but also on interaction with the rigidity of the specific workpiece.

Starting from the condition of clamping with the clamping device stationary, in which equilibrium prevails between the stresses and strains of the clamping device on the one hand and of the clamped workpiece on the other hand, this condition of equilibrium is changed by the influence of centrifugal force when the clamping device is rotating. Although the absolute value of the centrifugal force depends on the mass of the clamping elements and the specific speed of rotation, only a part of this centrifugal force is used to reduce the clamping which exists at standstill. The remaining part of the centrifugal force is used for deformation, i.e. for the widening of the clamping device.

The ratio between the portion which reduces the clamping force and the portion which does not cause any reduction in clamping force depends, for the same clamping device and speed of rotation, in a specific manner on the rigidity, at the place of clamping, of the workpiece clamped at the time.

The condition of equilibrium which prevails in the clamped condition between the clamping device and the workpiece is obtained only as a result of the fact that the clamping device is able to apply such high forces that the workpiece is deformed within its elastic region, a part of the clamping energy being stored in the form of deformation in the workpiece.

When workpieces of lesser rigidity are in clamped condition with the spindle stationary, relatively high deformation of the workpiece takes place which, upon the widening of the clamping device by the centrifugal force results in subsequent expansion of the workpiece and thus in less loss of clamping force. In the case of workpieces of greater rigidity, on the other hand, despite the application of the same amount of clamping force under the same conditions, less deformation is produced due to the greater rigidity of the workpiece. Accordingly, upon the occurrence of this centrifugal force there is only a small elastic recovery path present so that under the same clamping conditions less residual clamping force remains in the case of rigid workpieces than in the case of soft workpieces. The rigidity of the workpiece, other conditions being the same, is thus of decisive importance for the clamping force which remains under the action of centrifugal force.

SUMMARY OF THE INVENTION

The object of the present invention is to provide a method of determining the clamping force present in a rotating clamping device in order to hold a given workpiece fast, with due consideration of the centrifugal force, by a clamping-force transducer which is clamped in position in place of the workpiece and, due to consideration of the rigidity of the workpiece, avoids the danger of accident which is inherent in the known methods as a result of defective assumptions and further, despite the use of a clamping-force transducer instead of the corresponding workpiece during the measuring process, provides a relatively accurate determination of the clamping force present during the subsequent clamping of the given workpiece at the predetermined speed of rotation of the clamping device.

The solution of this problem which is provided by the invention is characterized by the fact that the clamping force measured by the clamping-force transducer for a predetermined condition of clamping with the clamping device in rotation is fed to a computer, to which the values of the rigidity of the clamping device and of the workpiece are fed from an input storage, in order to calculate the clamping force which occurs upon the clamping of the workpiece.

By the method of the invention there is obtained a very good approximation of the clamping force determined with the use of a clamping-force transducer to the clamping force actually occurring during the clamping of the workpiece at the predetermined speed of rotation of the rotating clamping device, so that the safety factors heretofore employed can be considerably reduced. Therefore, in the case of workpieces which are sensitive to deformation, undesired deformations as a result of the clamping can be avoided and, in the case of rigid workpieces, higher cutting outputs can be applied so that the cutting speeds, which have been considerably increased as a result of modern cutting tools, can be utilized without assurance against accidents being impaired.

In accordance with another feature of the invention, assuming linear functions for the rigidity of the clamping device, workpiece and clamping-force transducer, the loss in clamping force is calculated in accordance with the formula:

$$\Delta F_{SpA} = \frac{\Delta F_{SpA}\left(1 + \frac{R_F}{R_A}\right)}{1 + \frac{R_F}{R_W}}$$

in which $\Delta F_{SPA}$ is the loss in the clamping force measured with the clamping-force transducer, $R_F$ is the rigidity of the clamping device, $R_A$ is the rigidity of the clamping-force transducer and $R_W$ is the rigidity of the workpiece. Despite the assumption of linear functions for the different rigidities which has been made above, this proposal made by the invention provides a very good approximation of the clamping force determined by the method of the invention to the clamping force which is actually present, so that a simple mathematical calculation can be carried out. Of course, it is also possible in accordance with the method of the invention to feed the input storage with the variation in rigidity of the clamping device, workpiece and clamping-force transducer based on calculated or empirically determined functions which are not linear, so that the approximation to the clamping force which is actually present is further improved.

As a further development of the method of the invention, it is possible to determine the clamping force available with the clamping of a given workpiece over the entire range of speeds of rotation of the clamping device, at intervals of predetermined speed steps and feed these to a storage from which the values can be recalled as required. In this case not only is the clamping force available for each selectable speed of rotation determined, but the operator also has available to him or her a decision aid should the clamping force determined for the selected speed of rotation be too low or too high so that for the next machining job either a lower speed of rotation must be selected due to considerations of safety, or a higher speed of rotation can be selected in order better to utilize the cutting possibilities.

By the method of the invention it is furthermore possible to indicate not only the respective clamping force for the workpiece but also the corresponding speed of rotation. Finally, it is possible, in accordance with the invention, for the inputted values of the rigidity of the clamping device, the clamping-force transducer and the corresponding workpiece to be continuously displayed, so that these values can be noted at any time by the operator of the machine tool.

With the above and other objects and advantages in view, the present invention will become more clearly understood in connection with the detailed description of a preferred embodiment showing the method of the invention for the determination of the clamping force, when considered with the accompanying drawings, in which:

FIG. 1 is a first diagram in which the deformations of a chuck and of a clamped workpiece are plotted for a workpiece of solid material as a function of the clamping force, with due consideration of the centrifugal force, together with a diagram of the chuck and of the workpiece;

FIG. 2 is a diagram corresponding to FIG. 1 together with a diagrammatic showing in which a workpiece provided with a borehole is clamped in the same chuck in place of the solid workpiece;

FIG. 3 is a diagram with diagrammatic showing corresponding to FIGS. 1 and 2, in which a clamping-force transducer is clamped in the same chuck instead of the workpiece;

Figure 4:
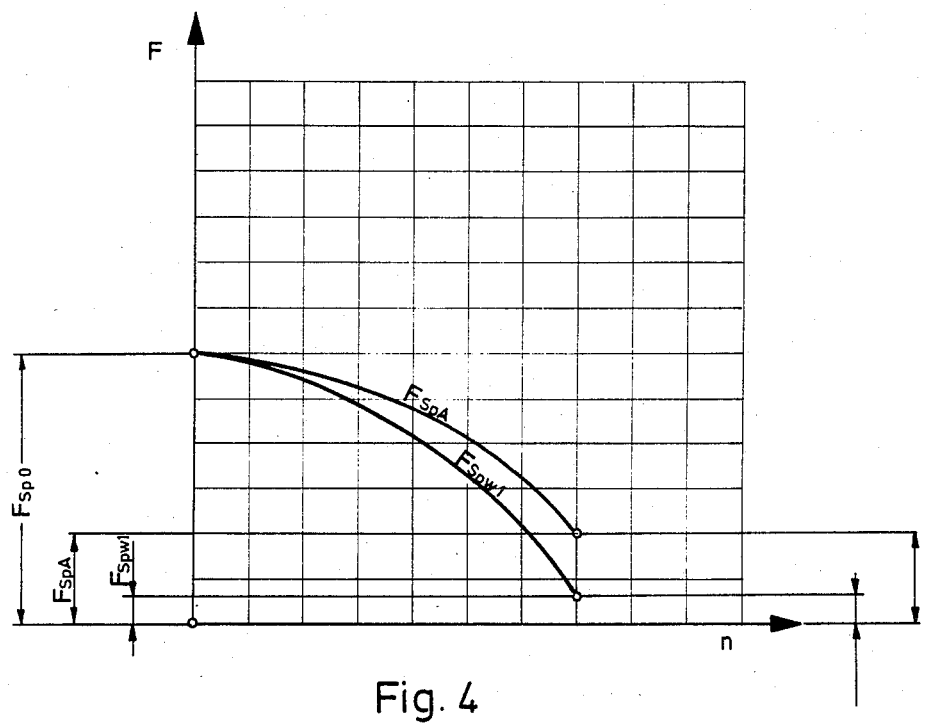
FIG. 4 is a diagram which shows the variation of the clamping force over the speed of rotation in the event of a clamping in accordance with FIG. 1.

FIG. 1 shows the clamping situation of a workpiece 1 in a chuck F, the workpiece $W_1$ being made of solid material, i.e. without a bore. Above the diagrammatic showing the variation of the clamping force is plotted with reference to deformation of the chuck F and the workpiece $W_1$. The diagram shows that when the chuck F with clamped workpiece $W_1$ is not rotating a condition of equilibrium prevails. The clamping force $F_{SPO}$ when the chuck F is not rotating has led, corresponding to the effective rigidity $R_F$ of the chuck F, to the deformation $\Delta V_F$ of the chuck and at the same time, corresponding to the rigidity $R_{W1}$ of the workpiece $W_1$, to the deformation $\Delta V_W$ of the workpiece $W_1$. This means, in other words, that the chuck F has widened as a result of the clamping force $F_{SPO}$ in accordance with the line $R_F$ and the workpiece $W_1$ has been deformed in accordance with the line $R_{W1}$.

If the chuck F is now placed in rotation, then the centrifugal force $F_C$ acts in addition to the clamping force $F_{SPO}$. This widens the clamping chuck F so that the clamping force $F_{SPO}$ present at standstill is reduced by the loss in clamping force $\Delta F_{SpW1}$. Only the holding force $F_{SpW1}$ is now still available in order to hold the workpiece $W_1$ fast. Since in the case of rigid workpieces the increase in force relative to distance is very steep, the loss in clamping force $\Delta F_{Sp}$ is very great in the case of the workpiece $W_1$ made of solid material.

In the diagram of FIG. 2, a workpiece $W_2$ having a bore is clamped in the same chuck F, i.e. a chuck of the same rigidity $R_F$, as can be noted from the diagrammatic showing of FIG. 2. This workpiece $W_2$, as a result of the bore, has a lower rigidity $R_{W2}$. In accordance with the diagram, the same clamping force $F_{SPO}$ is applied at standstill. Again a condition of equilibrium is obtained.

If the chuck F is now placed in rotation with the same speed as in the diagram of FIG. 1, the same centrifugal force $F_C$ is again produced. The loss in clamping force $\Delta F_{SpW2}$ is, however, substantially less, since the curve of the rigidity $R_{W2}$ of the workpiece $W_2$ is of smaller slope than the line $R_{W1}$ representing the rigidity of the workpiece W1. The diagram of FIG. 2 thus shows that the holding force $F_{SpW2}$ for the machining of the workpiece $W_2$ is substantially larger than the corresponding holding force, determined at the same speed of rotation, for the workpiece $W_1$.

From the two diagrams of FIGS. 1 and 2 it is thus clear that the holding force for holding a workpiece fast depends in very decisive fashion on the rigidity of the workpiece.

FIG. 3 now shows a situation which corresponds to both of the showings explained above if, instead of the workpieces $W_1$ and $W_2$, a clamping-force transducer A is clamped in the chuck F. In this connection it has been assumed that the rigidity $R_A$ of the clamping-force transducer A is intermediate between the rigidities $R_{W1}$ and $R_{W2}$ of the workpieces $W_1$ and $W_2$ respectively. The curves of these two rigidities $R_{W1}$ and $R_{W2}$ have been shown in FIG. 3 in thinner lines.

Furthermore there is shown in FIG. 3, for the same chuck F and the same speed of rotation, the centrifugal force $F_C$ which is obtained when the chuck F is placed in rotation. There is obtained the holding force $F_{SpA}$ for the clamping-force transducer A, after subtraction of the clamping-force loss $\Delta F_{SpA}$.

Upon a comparison of the three diagrams of FIGS. 1, 2 and 3 it can be seen that the deformation force $\Delta F$ of the chuck F as well as the loss in clamping force $\Delta F_{Sp}$ as a result of the centrifugal force depend in decisive fashion on the rigidity of the clamped workpieces $W_1$ and $W_2$ and of the clamping-force transducer A, respectively. The holding force $F_{SpA}$ for the clamping-force transducer A, measured by the clamping-force transducer A in the predetermined condition of clamping with the chuck F in rotation, is fed to a computer (not shown) which, with due consideration of the inputted values for the rigidity $R_W$ of the specific workpiece W and the rigidity $R_A$ of the clamping-force transducer A, calculates the holding force $F_{SpW}$ actually occurring for the specific workpiece W. Consequently errors are avoided in the determination of the holding force present for holding a given workpiece fast, with due consideration of the centrifugal force $F_C$.

In FIG. 4 the variation of the holding force of a given chuck F with respect to the speed of rotation n is plotted for a clamping-force transducer A on the one hand and for the particularly rigid workpiece $W_1$ on the other hand. The diagram shows that the desired value measured by the rotating clamping-force transducer A is considerably greater than the actual value which results if a workpiece $W_1$ with the considerably greater rigidity $R_{W1}$ is clamped in the chuck F instead of the clamping-force transducer A having the rigidity $R_A$. FIG. 4 clearly shows that such a situation is particularly dangerous since the clamping force actually drops substantially below the clamping force $F_{SpA}$ assumed for the specific machining job, so that the workpiece $W_1$ may fly out of the clamping chuck F under the force exerted by the machining.

Figure 5:
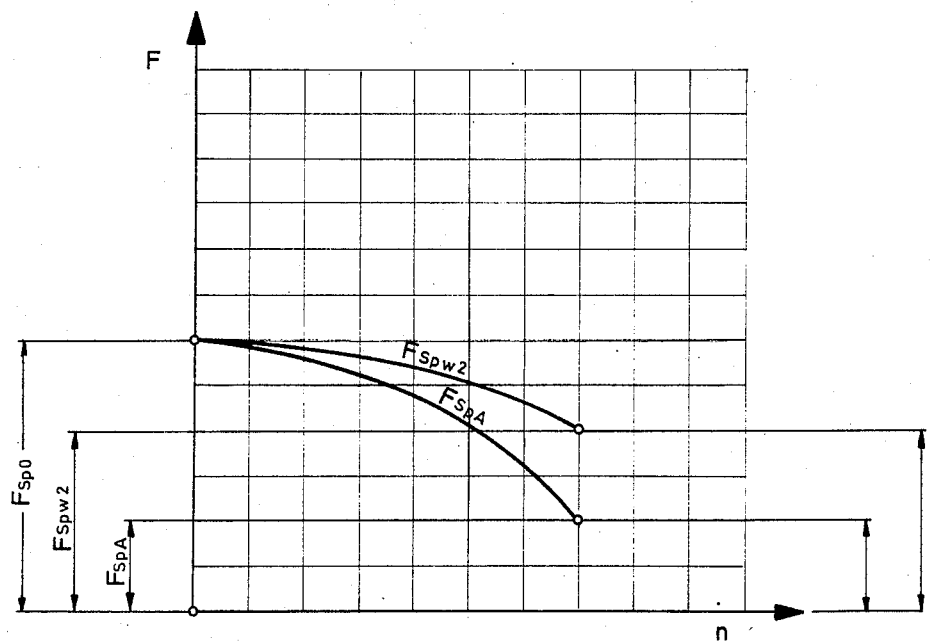
FIG. 5 shows a diagram, corresponding to FIG. 4, of the variation of the clamping force in the case of the workpiece shown in FIG. 2.

In the case shown in FIG. 5, the diagram, which corresponds to FIG. 4, shows that the holding force $F_{SpA}$ measured by the clamping-force transducer A is considerably less than the actual holding force $F_{SpW2}$ for the workpiece $W_2$ since the workpiece $W_2$ is softer than the clamping-force transducer. The desired value $F_{SpA}$ measured with the clamping-force transducer A is, accordingly, considerably below the true actual value $F_{SpW2}$ which is obtained during the clamping of the workpiece $W_2$ in the chuck F instead of the clamping-force transducer A.

This case shows that upon the clamping of softer workpieces $W_2$ an unnecessary deformation of the workpiece $W_2$ may be obtained and thus in part impermissible deviations in shape. Without the method of the invention for determining the clamping force present in a predetermined condition of clamping, too much clamping force is thus present in this example.

FIGS. 4 and 5 show what errors occur if the invention is not used. These errors are eliminated by the invention by determining the holding forces $F_{SpW1}$ and $F_{SpW2}$ actually present for the corresponding workpieces $W_1$ and $W_2$ respectively are determined from the value of the holding force $F_{SpA}$ measured by the clamping-force transducer A and then displaying these holding forces. It is now the task of the operator, by changing the clamping parameters, to obtain as accurately as possible the holding force predetermined for each given workpiece which corresponds to the desired value $F_{SpA}$ in FIGS. 4 and 5. For this, the force applied for the clamping is, in particular, changed.

Only the method of the invention thus makes it possible in practice to optimize the clamping process for the machining in such a manner that the optimum holding force $F_{SpA}$ is actually present on the chuck F for the specific workpiece W to be machined.

The foregoing formula for the loss in clamping force $\Delta F_{SpW}$ enables the operator to select readily the desired parameters, particularly in view of the fact that the calculation with the formula can be done manually or by use of any of a large variety of computers presently available.

In use of the formula, the change in clamping force upon the transducer $\Delta F_{SpA}$ is obtained readily by the conventional procedure of measuring the force at stall and during rotation. The various rigidities, measured in terms of newtons per micrometer, are known beforehand, or may be measured by conventional techniques.

I claim:

1. A method of determining the clamping force present in a predetermined condition of clamping, in a rotating clamping device, for holding a predetermined workpiece fast, taking centrifugal force into consideration, comprising the steps of:

in place of the workpiece, clamping a clamping-force transducer in position in the clamping device in the predetermined condition of clamping, measuring a clamping force on the transducer, feeding to a computer the clamping force measured on the clamping-force transducer in the predetermined condition of clamping by the rotating clamping device, feeding values of rigidity of the clamping device and of the workpiece from an input storage to said computer, and calculating from said measured clamping force and said rigidity values by said computer the clamping force occurring upon clamping of the workpiece.

2. The method according to claim 1, further comprising the step of feeding a value of rigidity of the transducer to the computer, and wherein the step of calculating assumes linear functions for the rigidity of the clamping device, the workpiece and the clamping-force transducer, and calculates a loss in clamping force caused by the centrifugal force in accordance with the formula $$\Delta F_{SpW} = \frac{\Delta F_{SpA}\left(1 + \frac{R_F}{R_A}\right)}{1 + \frac{R_F}{R_W}}$$

in which $\Delta F_{SpA}$ is a loss in the clamping force measured with the clamping-force transducer, $R_F$ is the rigidity of the clamping device, $R_A$ is the rigidity of the clamping-force transducer, and $R_W$ is the rigidity of the workpiece.

3. The method according to claim 2, wherein the clamping force present upon the clamping of the predetermined workpiece is determined over a range of speeds of rotation of the clamping device at intervals of predetermined speed steps and fed to a storage from which the values can be recalled.

4. The method according to claim 2, further comprising
continuously displaying inputted values for the rigidity of the clamping device, the rigidity of the clamping-force transducer, and the rigidity of the workpiece.

5. The method according to claim 1, wherein
the clamping force available upon the clamping of the predetermined workpiece is determined over a range of speeds of rotation of the clamping device at intervals of predetermined speed steps and fed to a storage from which the values can be recalled.

6. The method according to claim 5, further comprising
displaying a corresponding speed of rotation in addition to clamping force for the workpiece.

7. A method of determining a loss in clamping force exerted by a rotatable clamping device upon a workpiece due to rotation of the clamping device and the workpiece, the method comprising the steps of:

inserting a force-measurement transducer into said clamping device;

measuring the clamping force of said clamping device upon said transducer when said clamping device is stationary;

rotating said clamping device with said transducer to obtain a measurement of the clamping force when said clamping device is under rotation;

subtracting the clamping force measured during rotation from the clamping force measured with the stationary clamping force to obtain a loss of clamping force upon said transducer; and multiplying the loss of clamping force upon said transducer by the factor $$\frac{(1 + R_F/R_A)}{(1 + R_F/R_W)}$$

to obtain the loss in clamping force which would be experienced by said workpiece upon insertion of said workpiece into said clamping device, the terms $R_F$, $R_A$, $R_W$ being the rigidities of the clamping device, the transducer, and the workpiece, respectively.

* * * * *